May 8, 1923.
R. S. MOORE
BELT FASTENER
Filed July 10, 1922
1,454,450
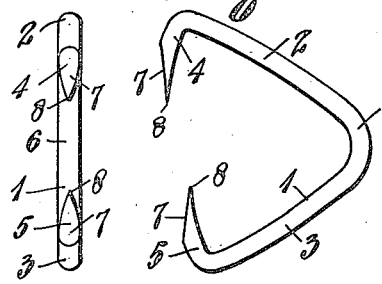
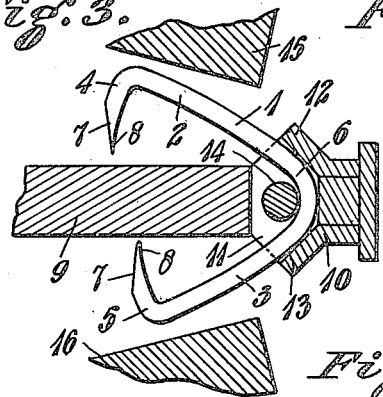
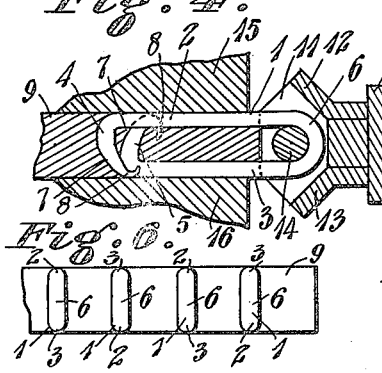
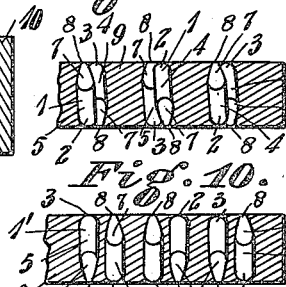
INVENTOR
R. Sherman Moore
BY Clarence Perdew
ATTORNEY

Patented May 8, 1923.

1,454,450

UNITED STATES PATENT OFFICE.

R SHERMAN MOORE, OF CINCINNATI, OHIO.

BELT FASTENER.

Application filed July 10, 1922. Serial No. 573,843.

*To all whom it may concern:*

Be it known that I, R SHERMAN MOORE, a citizen of the United States, residing at Cincinnati, in the county of Hamilton and State of Ohio, have invented certain new and useful Improvements in Belt Fasteners, of which the following is a specification.

My invention relates to devices for fastening together the ends of belts used for transmission of power. Its object is to dispose the fastening material in the belt end parts so as to avail of the strength of the belt material more fully, thereby making a stronger fastening. Other objects will appear in the course of the ensuing description.

I attain these objects by the device illustrated, for example, in the accompanying drawing, in which—

Figure 1 is a detail end elevation of one of the fasteners or clips, open ready for applying to a belt;

Fig. 2 is a side elevation of the same;

Fig. 3 is a sectional view showing apparatus in which the clip is held, and by which it is closed into the belt, only parts of the apparatus and the belt being shown, and the clip being open, as in Figs. 1 and 2;

Fig. 4 is a similar view showing the clip closed into the belt by the apparatus;

Fig. 5 is a cross-section at right angles to the section in Figs. 3 and 4, showing the closed clips in end elevation in the belt;

Fig. 6 is an end view of the belt with the clips therein;

Fig. 7 is a partial plan view of two belt-ends joined by means of my fasteners;

Fig. 8 is an end view corresponding to Fig. 1, showing a modification of the clip or fastener;

Fig. 9 is a partial plan view showing modified holding means in which this modified fastener is held;

Fig. 10 is a cross-section corresponding to Fig. 5 showing this modified fastener in end elevation as closed into the belt;

Fig. 11 is an end view corresponding to Fig. 6, showing the modified clips or fasteners therein; and Fig. 12 is a partial plan view corresponding to Fig. 7, showing the belt joined by these modified clips or fasteners.

As shown in Figs. 1 to 7, inclusive, each clip 1 is a piece of wire bent to form two members 2 and 3, each with a spur 4 or 5, respectively, at its free end, extending toward the other member, and the bend 6 being of large radius, while the members 2 and 3 arch or curve outwardly from each other, from this bend 6 to the respective spurs 4 and 5. Both spurs 4 and 5 have their sides 7 remote from the bend 6 inclined from about midway of their lengths to rather thin points 8. The angle of divergence of the members 2 and 3 from their meeting curve is somewhat less than ninety degrees; and the spur 4 or 5 of each member 2 or 3 projects from the member at an angle of somewhat less than ninety degrees. These angles are such that the points of the spurs 4 and 5 will easily clear the opposite surfaces of a belt end part 9 inserted between the clip members; and that with this part 9 thus inserted and the clip disposed symmetrically thereto, the spurs 4 and 5 will be directed toward the respective adjacent surfaces of the belt part 9 substantially at right angles thereto, as shown in Figs. 2 and 3. Also, one member 3 is considerably shorter than the other member 2, so that the spur 5 is nearer the curve 6 than is the spur 4.

A sufficient number of such clips 1, which may be supplied in a suitable package ready for insertion, but not disclosed herein, are placed in a suitable holder 10 (Fig. 3) having a series of teeth 11, each two adjacent ones of which receive the rear part of a clip 1 adjacent to the bend 6 thereof between them. Preferably, these clips are placed alternately with the short and long members 3 and 2 up and down. If not supplied in a ready package, the clips 1 may be inserted one at a time in the spaces between the teeth 11 of this holder 10. Also, it will be understood that a holder different from this holder 10 may be used; various kinds of holders for wire belt clips or fasteners being known in the art. The holder 10, here shown, is similar to that disclosed and claimed in my copending applications, Serial No. 479,679, filed June 22, 1921, and Serial No. 554,506, filed April 18, 1922. Such a holder has forwardly diverging upper and lower plates 12 and 13, out along which the respective members 2 and 3 extend, with a mandrel 14 slipped through alined holes in the teeth 11, confining the clips 1 in the desired position. This holder is suitably supported in a pressing device, preferably, as for example the device of either application above referred to, having an upper jaw 15 and a lower jaw 16, with suitable means, not shown herein, for bringing these jaws together substantially parallel with the respective adjacent surfaces of the belt end part 9, to close the clips into the belt, as seen in Fig. 4.

Thus, the members 2 and 3 of the clips 1 are bent together, pressing the spurs 4 and 5 into the opposite sides of the belt part 9, and forming a loop on each clip by bending the wire of the bend 6 more completely around the mandrel 14. The members 2 and 3 will be embedded in the belt material, with the spurs 4 and 5 pushed completely through the belt and curled back and into the belt again, and clinched, on the respective opposite sides of the belt. The inclination of the spur on its side remote from the junction bend 6, and consequent thinness of the spur point, facilitates this curling and clinching. The arching of the members 2 and 3 outwardly, to be pressed straight in the completion of the closing operation, permits the spurs 4 and 5 to enter the belt approximately at right angles, yet not to incline excessively back toward the junction curve 6 upon completion of the closing, since the straightening motion of the outer end part of the member 2 or 3 tilts the respective spur 4 or 5 therewith in an outward direction away from the junction curve or loop, thus counteracting the other tilting of these spurs by virtue of the swinging of the member 2 or 3 as a whole, from the junction of the members in the curve 6. Also, a very important advantage resulting from this arching, bowing or curving of the members outward, is the avoidance of a preponderance of action of the jaws 15 and 16 out near the free ends of the members in the progress of the closing action of the jaws. It will be seen that the curvature is such that the member 2 or 3 bears a rocker relation to the flat jaw surface, so that there is a relative rocking or rolling effect from the closing pressure of the jaws. This I have found to contribute to the final correct positioning of the clip parts in the belt.

By having the points of the spurs 4 and 5 relatively thin, compared with the junctions of the spurs with the members 2 and 3, the spur ends receive most of the bending, curling backward and inward, opposite to the direction of working pull on the clip; while the thicker junction parts maintain substantially their original angle to the respective members 2 and 3, to extend approximately perpendicularly through the belt. This avoids undue crushing of the belt material such as occurs if the spurs are so made that most of the bending comes at their junctions with the main parts of the clip, finally bending the spurs until they have acute angles between them and the main parts, which catch and crush the belt material between these parts so bent together. It is highly desirable to start the spur into the belt substantially at right angles to the adjacent belt surface; because if it is inclined initially so as to assume the perpendicular final position so desirable as just noted, merely by virtue of the swinging of the member 2 or 3 as a whole, it will point forward away from the junction bend 6 in this initial condition, and when the pressure is applied it will tend to point more in that direction, at an inclination permitting it to pull out of the belt when the closing is completed. The arching, and the kind of pointing, above described, overcomes this difficulty.

As each spur emerges from the opposite side of the belt, it passes to one side or the other of the opposite member 2 or 3 which is being embedded in that opposite side. When my improved clip is made by machinery, there is a tendency always to form one spur slightly different from the other, so that each spur will glance to a certain side of this opposite member, in every clip; thus the disposition of these points, which become clinched into the belt, will be uniform. In the finished fastening, only a small part of this curled part of the spur is visible, as indicated in Fig. 7. This uniform disposition of these spurs is not essential, however; and any of them may pass to the opposite side as seen at A in Fig. 7, without affecting the utility of the fastening. The spur 4, on the longer member 2, meets the outer side of the junction curve where the other spur 5 joins the shorter member 3, as seen in Figs. 4, 5 and 7. However, it will be understood that the relative lengths of the members 2 and 3 may be varied, or the proportioning of the spurs may be varied, so that the spur of the longer member entirely avoids contact with the shorter member or its spur.

In Figs. 8 to 12, inclusive, the clip or fastener 1' is like that of Figs. 1 to 7, inclusive, except that, approximately coextensive with the junction bend 6 of the two members 2 and 3, there is a compound curve or bend 17 at right angles to the bend 6, so that the member 2 and its spur 4 are in a plane offset from that occupied by the member 3 and its spur 5. Such a clip is held in a modified holder 10' having its teeth 11' farther apart to admit the slightly spaced clip members, and having notches 18 in the bottoms or backs of the spaces between the teeth, to receive the central parts of the curves 6 and 17 forming the extreme rear ends of the clips (Fig. 9.) Such a holder is fully disclosed and claimed in my copending application above first mentioned. This clip 1', when closed into the belt, acts the same as that in the first example; but its spurs 4 and 5 assume a staggered arrangement in the belt 9, so that the curled and clinched spur ends do not strike the opposite members. Also, as the members 2 and 3 are offset, where they are embedded in the opposite sides of the belt, they have less tendency to crush the belt material than where these members are embedded in the same plane at right angles through the belt, as in the previous example. This is in accordance with the other provisions, as the right-angled disposition of the spurs and the difference of length of the members, offsetting the spurs lengthwise of the belt, in both of these examples, to leave as much as possible of the belt material without disturbance or crushing, on all sides of the clip parts in the belt. The result of such provisions is a stronger belt fastening, for given thickness, width and quality of material of the belt.

Not only is the belt material thus conserved, but the clinching, in either example, is such as to dispose the strength of the clip material to the best advantage. With the clip points curled over backward, toward the end of the belt, the tension on the belt, in order to withdraw the clip from the belt by overcoming the stiffness of the clip material, must unroll or unwind this curled point from the belt material. This curled point is thus adapted to exert a snubbing effect, similar to that of a cable thrown around a post, for example, in which the friction of drawing the one member around the other is excessive, and very well adapted to resist such withdrawing action. Until these curled points unwind, the other parts of the clip cannot yield. It will be understood that these points, in thus curling inward, become very stiff, as in any case of severe bending of a metal wire. Therefore, with the belt material of ordinary dependability, these curled-ended clips are very well insured against withdrawal in service.

Each belt end 9 being supplied with clips by pressing with the clips held by the mandrel 14 in the holder 10 or 10', which mandrel is withdrawn endwise upon completion, the two belt ends 9 are brought together with the clip loops of one end entering between those of the other. With the offset clips of Figs. 8 to 12, inclusive, the spiral loops 6, 17 of the clips in the two ends of the belt 9 will register when the belt ends are brought around together, without the need of any precaution as to proper positioning these loops; whichever way the clip is applied, the spiral loop will incline the same way, whichever side of the belt is turned up. In either example, however, it is desirable to have the alternate arrangement of short and long clip members on each side of the belt, as before mentioned. With the clips of either example thus brought together, a pin 19 is slipped through all of the clips of the two ends, completing the belt coupling, as shown in Fig. 7 illustrating the completed coupling of the first example, or in Fig. 12, showing that of the second example.

Other modifications are possible, and therefore, while certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. In a belt-fastener, a clip comprising two members joining in a bend and diverging from said bend, and spurs extending toward each other from said members, said members being arched away from each other between said bend and their respective spurs.

2. In a belt-fastener, a clip comprising two members joining in a bend and diverging from said bend, and spurs extending toward each other from said members and sloped to their points on their sides remote from said bend, said members being arched away from each other between said bend and their respective spurs.

3. In a belt-fastener, a clip comprising two members joining in a bend and diverging from said bend, and spurs extending toward each other from said members at different distances from said bend and sloped to their points on their sides remote from said bend, said members being arched away from each other between said bend and their respective spurs.

4. In a belt-fastener, a clip comprising two members joining in a bend and diverging from said bend to extend on opposite sides of a belt, and spurs extending toward each other from said members at an angle whereby said spurs are presented substantially perpendicularly to the respective sides of the belt, for entrance into the belt as the members are swung toward each other by further bending at their junction, said members being arched away from each other between said bend and their respective spurs so that a straightening of these members from their arched shapes counteracts the tendency to incline said spurs as the spurs are swung with the members, into the belt.

5. In a belt-fastener, a clip comprising two members joining in a bend and diverging from said bend to extend on opposite sides of a belt, and spurs extending toward each other from said members at an angle whereby said spurs are presented substantially perpendicularly to the respective sides of the belt, for entrance into the belt as the members are swung toward each other by further bending at their junction, each spur being sloped to its point, the slope being such that the junction of the spur with the member is relatively much thicker than is the spur for a considerable distance from its point, whereby said spur, near said point, can curl toward said bend and toward the member to which the spur is joined when forced through a belt onto a clinching surface, and thus be forced into and clinched in said belt, and whereby most of the bending, in this belt-fastening operation, is in this curling part of the spur, so that the spur is substantially not bent at said junction with the member, in said operation, and said members being arched away from each other between said bend and their respective spurs so that a straightening of these members from their arched shapes counteracts the tendency to incline these spurs as the spurs are swung with the members, into the belt.

6. In a belt-fastener, a clip comprising two members joined in a compound bend and diverging from said bend and offset laterally from each other due to said bend, and spurs on said members, extending toward each other, with their sides remote from said bend inclined to their points whereby the spurs are much thinner at and nearer their points than at their junctions with the members, to protrude through and curl back into a belt, toward said bend, and said members being arched away from each other from said bend to their respective spurs, to counteract the tendency of the spurs to incline bodily toward said bend by the swinging of the members toward each other.

7. In a belt-fastener, a clip comprising a piece of material of cross-section such that one side presents a surface receding from an initially belt-contacting lesser area, bent to form two members joining in a bend and diverging from said bend and spurs extending toward each other from said members and laterally offset from each other, with said side of said material presented inwardly to wedge into the belt material.

8. In a belt-fastener, a clip comprising a piece of material of cross-section such that one side presents a surface receding from an initially belt-contacting lesser area, bent to form two members joining in a compound bend and diverging from said bend and spurs extending toward each other from said members and being laterally offset from each other due to said compound bend.

9. In a belt-fastener, a clip comprising a piece of material of cross-section such that one side presents a surface receding from an initially belt-contacting lesser area, bent to form two members joining in a bend and diverging from said bend and spurs extending toward each other from said members each spur being sloped to its end on its side remote from said bend, forming, in conjunction with said inwardly presented receding surface, a point that is substantially symmetrical transversely of the fastener, and the slope being such that most of the bending, in the fastening operation, is near the point.

10. In a belt-fastener, a clip comprising a piece of round wire bent to form two members joining in a bend and diverging from the bend and spurs extending toward each other from said members and laterally offset from each other.

11. In a belt-fastener, a clip comprising a piece of round wire bent to form two members joining in a compound bend and diverging from the bend and spurs extending toward each other from said members and laterally offset from each other by said compound bend.

12. In a belt-fastener, a clip comprising a piece of round wire bent to form two members joining in a bend and diverging from the bend and spurs extending toward each other from said members, each spur being sloped to its end on the side remote from said bend, forming, in conjunction with the circular cross-section of the wire, a point that is substantially symmetrical transversely of the fastener, and the slope being such that most of the bending, in the fastening operation, is near the point.

R. SHERMAN MOORE.